May 12, 1953  H. LEWIS  2,638,083
SPARK PLUG
Filed Nov. 9, 1949

INVENTOR.
HARRY LEWIS
BY
Hyde, Meyer, Baldwin & Doran
ATTORNEYS

Patented May 12, 1953

2,638,083

UNITED STATES PATENT OFFICE 2,638,083

SPARK PLUG

Harry Lewis, Cleveland, Ohio

Application November 9, 1949, Serial No. 126,318

1 Claim. (Cl. 123—169)

The invention relates to spark plugs for internal combustion engines. It particularly relates to a novel and improved disposition of the constituent elements of a spark plug so as to provide an extremely efficient firing arrangement thereby.

An object of the invention is to provide a spark plug which produces rapid and even fuel ignition under adverse operating conditions such as low temperatures in starting, or poor quality of fuel, even under heavy loads.

Another object of the invention is to provide a spark plug having an electrode arrangement, novel in structure and design, whereby accumulation of carbon on the sparking surface is greatly reduced or entirely eliminated.

Another object of the invention is to provide a spark plug having novel means for permitting escape of enriched gaseous mixtures, or liquid fuel deposits from around or behind the electrodes.

Another object of the invention is to provide a novel electrode means providing adequate and even firing effect even under adverse conditions and heavy loads.

Another object of the invention is to provide a spark plug requiring no periodic adjustments.

Another object of the invention is to provide a spark plug wherein the spark may originate at any one of a plurality of circumferentially spaced zones, thereby minimizing or completely preventing electrode burning.

Other objects and advantages will be apparent from a study of the following specification, in conjunction with the attached drawings, in which.

Figure 1:
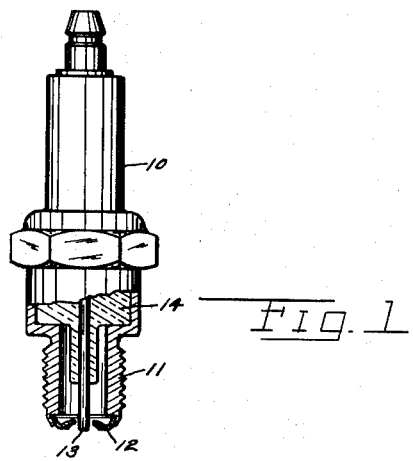
Fig. 1 is a view partly in side elevation, and partly in section, showing a spark plug embodying my invention.

In the development of the internal combustion engine over a period of the last fifty years, a great deal of intensified effort has been devoted to increasing the efficiency of the engine. This development of course involved many factors, including fuel mixtures, fuel quality, determination and regulation of optimum operating temperatures, and, in more recent years, the control of the actual process of combustion itself by variations in combustion chamber contour, so that the development of the maximum pressure of the burning fuel occurs at the proper point in the cycle.

Those skilled in the art are familiar with many efforts made along these lines and with the trial and use of many more or less intricate designs of combustion chamber which have appeared in, and subsequently disappeared from commercial use. In all of these efforts, the only function of the spark plug has been to supply a spark, from substantially a point source, at what was conceived to be the proper firing point in the combustion chamber.

In contradistinction to this previous practice I supply within the combustion chamber a firing impulse distributed over an annular zone, but interrupted at spaced locations, the electrode firing areas being substantially free from fouling due to carbon deposits.

Further advantages other than those hereinabove enumerated will appear from a study of the present specification, in conjunction with the accompanying drawings.

Referring now to the drawings there is shown a spark plug body 10 having a conventional screw threaded base 11 in the form of an annular flange adapted to seat in a cylinder head (not shown). The base 11 serves as an electrically conductive grounded support for an outer electrode 12, and an inner electrode 13 is insulated from the outer electrode in conventional fashion by non-conducting material 14. The inner electrode is shown as a rod or wire which at its upper end is in electrical communication with convenient means (not shown) assuring its connection in the ignition system.

The novel feature of the present invention resides in the character of the spark gap, which of course is determined by the structural relationship of electrodes 12 and 13, and in the present instance by the particular contour of the electrode 12 which will now be described in detail.

Figure 2:
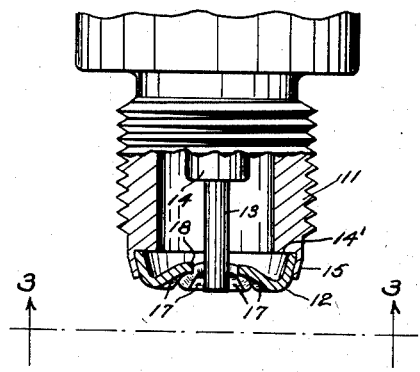
Fig. 2 is a sectional view, somewhat enlarged, and in vertical section, of a fragmentary portion of Fig. 1.

Electrode 12 is of saucer-like general contour, centrally perforated to permit passage therethrough, with clearance of the central electrode 13. The upper outer periphery of electrode 12, in assembly of the elements, is pushed upwardly against an annular transverse shoulder 14' of the base 11, and then a flange 15, integral with base 11, is forced inwardly, either at spaced points, or completely around the periphery as shown, by any mechanical method such as spinning, crimping, peening, or otherwise, so as to retain the electrode in the operating position illustrated in Fig. 2.

Figure 3:
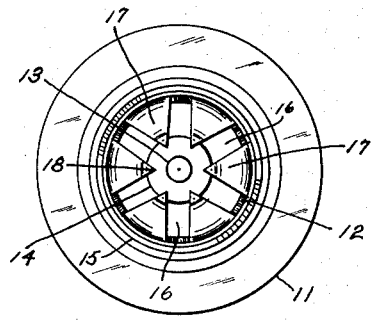
Fig. 3 is a bottom plan view, looking upwards from the neighborhood of the lines 3—3 of Fig. 2.

The central portion of the electrode 12, surrounding the perforation heretofore mentioned, is concave upwardly, and is provided, in the embodiment shown, with a plurality of radial slots 16 which are wide enough to result in the electrode having a plurality of segmental projections 17, triangular in bottom plan view (Fig. 3) each projection narrowing to a point 18 at its inner end. The segments therefore extend inwardly and upwardly, and the points 18 are spaced from the central electrode by an amount equal to the normal electrode spacing for the engine in which the plug is to be used. The upward inclination of the points prevents accumulation of fuel thereon. As is well known to those skilled in the art, the characteristics of an engine, such as the compression ratio, normal firing temperature, etc., determine the predetermined electrode spacing.

I have observed that the segmental portions 17 remain constantly clean and bright and their sparking capacity remains unimpaired, even after long service. The engine may be throttled down and then accelerated, even under load, without laboring or misfiring.

The annular electrode 12 may be formed integrally with the base or body 11, or it may be made up as a separate insert as shown. Its manner of securement is immaterial, as long as electrical communication is maintained between the electrode and the cylinder head in which the plug is grounded.

As a result of an extended series of tests I am enabled to state that the spark plug shown and described herein operates for long periods at a lower temperature than plugs heretofore available, thereby promoting the long service life of the plug. During its service life it never need be removed from the engine for cleaning or adjustment. By reason of the plurality of firing points 18, if at any firing time in the cycle any abnormal di-electric resistance is encountered at one of the points 18, the other points will fire in normal manner.

What I claim is:

A spark plug having a body portion, an annular extension depending from said body portion and adapted to seat in the combustion chamber wall of an internal combustion engine, an annular flange of reduced thickness depending from said extension and tapering inwardly and downwardly from said extension whereby to provide a downwardly facing annular shoulder at the meeting plane of said extension and said flange, said shoulder lying in a transverse plane, an outer electrode consisting of a saucer-like disk having a central aperture therein, the peripheral edge of said disk being upwardly and outwardly inclined and lying within and in contact with said annular flange, and being likewise in contact with said shoulder, said disk having a plurality of parallel-edged slots extending radially outwardly from said central aperture towards, but short of, said peripheral edge, whereby to define a plurality of segments surrounding the said central aperture, and extending inwardly from said edge, and an inner electrode electrically insulated from said outer electrode and having a part thereof extending into said central aperture, said segments being curved rearwardly towards the spark plug body, and then reversibly inwardly towards the said inner electrode.

HARRY LEWIS.

References Cited in the file of this patent

UNITED STATES PATENTS

| Number | Name | Date |
|---|---|---|
| 1,255,805 | Simmons | Feb. 5, 1918 |
| 1,258,269 | St. James | Mar. 5, 1918 |
| 1,331,387 | Sharp | Feb. 17, 1920 |
| 1,398,175 | Clemons | Nov. 22, 1921 |
| 2,300,730 | Kishbaugh | Nov. 3, 1942 |
| 2,314,128 | Caldwell | Mar. 16, 1943 |
| 2,478,167 | Dusseau | Aug. 2, 1949 |

FOREIGN PATENTS

| Number | Country | Date |
|---|---|---|
| 150,444 | Great Britain | Sept. 6, 1920 |